Patented Sept. 18, 1934

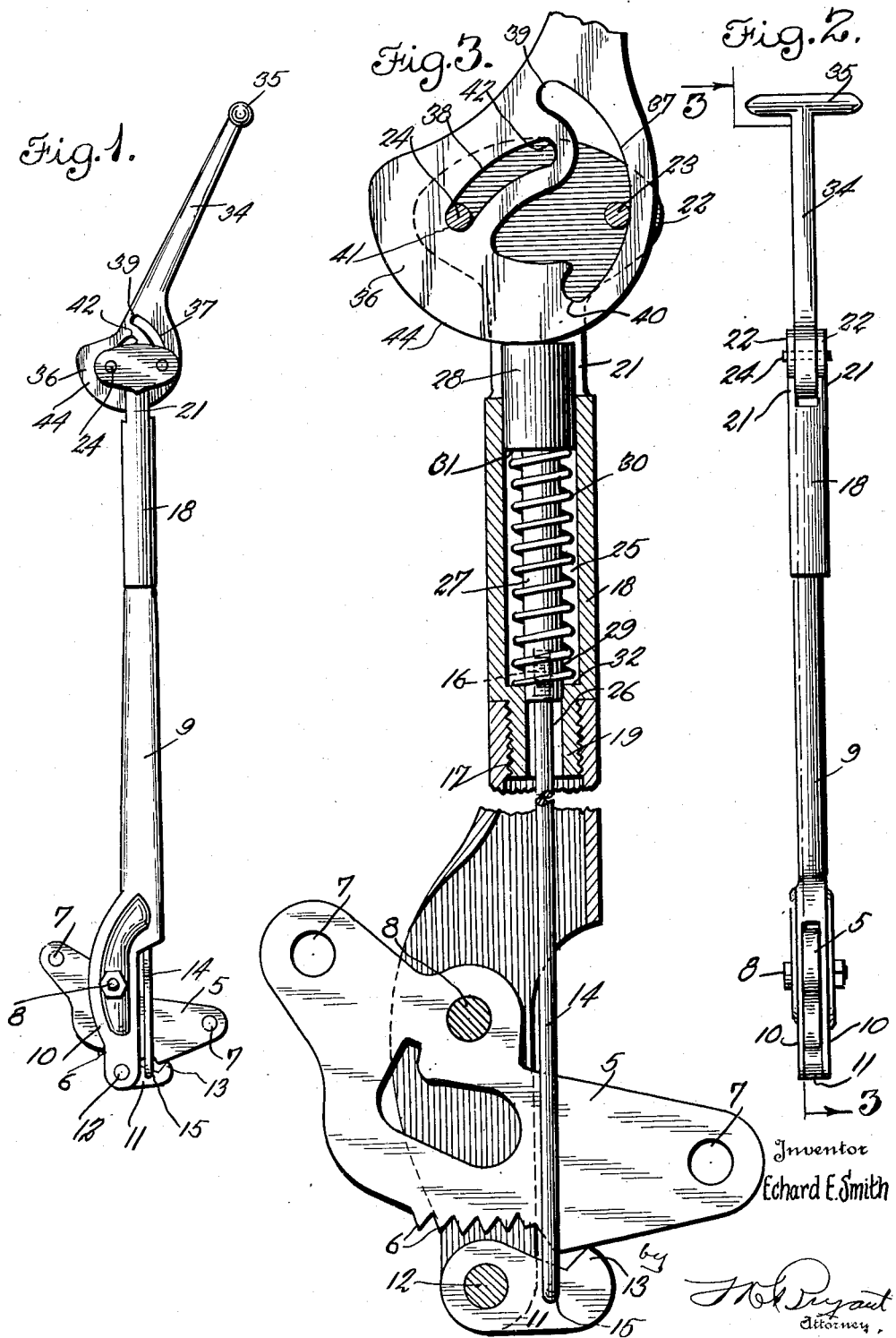

1,974,197

UNITED STATES PATENT OFFICE 1,974,197

BRAKE LEVER

Echard E. Smith, Denver, Colo.

Application July 20, 1933, Serial No. 681,347

5 Claims. (Cl. 74—39)

This invention relates to certain new and useful improvements in brake levers, particularly adapted for motor cars, tractors and locomotive braking systems.

The primary object of this invention is to provide an attachment for a conventional brake lever adapted to increase the leverage and simultaneously effect an easy release of said brake lever.

A further object of this invention is to provide a brake lever which will be easy to manipulate to set and released positions.

A still further object of this invention is to provide an attachment which may be secured to conventional brake levers without requiring the alteration of the brake lever insofar as its construction is concerned.

Other objects and advantages of the invention will become apparent during the course of the following description, taken with the drawing and in which, Figure 1 is a vertical side elevational view of the brake lever attachment secured to a conventional form of brake lever;

Figure 2 is a vertical front elevational view of the brake lever attachment illustrating the construction of the same and showing the T-shaped handle; and Figure 3 is an enlarged vertical cross-sectional view taken on line 3—3 of Figure 2, looking in the direction of the arrows illustrating the manner in which the attachment is assembled relative to the other operative parts of the conventional brake lever.

Referring more in detail to the accompanying drawing, the reference character 5 designates a segment plate having a series of ratchet teeth 6 and provided at opposite ends with openings 7 for attachment to the motor vehicle chassis frame.

Pivotally secured to the segment plate 5 by the bolt 8 is a brake lever 9 having a bifurcated lower portion 10 adapted to straddle the segment plate 5 as shown in Figure 2. Mounted between the bifurcated arm 10 of the brake lever 9 at the lowermost portion thereof is a pivoted dog 11 held in place by means of a bolt or rivet 12 and said dog 11 is provided with a tooth 13 adapted to engage the ratchet teeth section of the segment plate 5. Connected intermediate the ends of the dog 11 in a pivotal fashion as at 15 is an operating rod 14 which extends upwardly through the brake lever 9 and extends to the top of the brake lever wherein it is screw threaded as at 16. The upper end of the brake lever 9 is internally screw threaded as at 17 as is the usual construction.

The invention comprises a tubular extension having a lower reduced screw threaded portion 19 adapted to be received in the upper end of the internally screw threaded portion of the brake lever 9. The upper end of the tubular extension 18 is bifurcated as at 21 and is provided with flat oblong plates 22 having suitable connecting pins 23 and 24 in spaced relation. The tubular extension 18 is provided with an enlarged chamber 25 terminating in the lower end in a reduced bore 26 so that the upper end of the ratchet release bar 14 may extend therethrough as clearly shown in Figure 3.

Slidably mounted in the tubular extension 18 is a plunger 27 having the lowermost end thereof slidably received in the reduced portion 26 of the bore 25 with the upper end of the plunger 27 provided with an enlarged head 28 extending upwardly between the bifurcated arms 21. The lowermost end of the plunger 27 is provided with an internally screw threaded bore 29 adapted to receive the screw threads 16 formed on the upper end of the pivoted dog operating rod 14. Mounted within the chamber 25 and encircling the plunger 27 is a coil spring 30 having one end abutting the under surface 31 of the enlarged portion 28 of said plunger while the opposite end of the coil spring engages the abutment shoulders 32 at the bottom of the chamber 25.

Mounted between the flat oblong plates 22 carried by the bifurcated arms 21 is an operating hand lever 34 having a transverse hand hold 35 formed on the upper end thereof and being provided on the lower end with a flat cam plate 36. The cam plate 36 is provided with slots 37 and 38 in which are received the transverse spaced pins 23 and 24 respectively. It will be noted that the cam slot 37 is substantially at right angles to the cam slot 38 and terminates at 39 adjacent the juncture of the cam plate 36 with the operating handle 34 and as at 40 adjacent the heel of the cam plate 36, while the cam slot 38 terminates at 41 adjacent the toe of the cam plate 36 and at 42 in close relation to the cam slot 37. The cam plate 36 is provided with a cam face 44 adapted to engage the enlarged portion 28 of the sliding plunger 27.

When it is desired to set the brake such as by moving the transverse hand hold 35 to the right the plate 36 moves so that the pin 24 will reach the termination point 41 of the slot 38 upon which the pin 23 will bind in the slot 37 midway between the points 39 and 40 whereupon the lever may be moved rearwardly and the dog 11 will ratchet over the teeth 6 of the coil spring 30 normally urging the ratchet rod 40 upwardly. After the brake has been set it will be desired to release the same, the hand lever 35 is pushed forwardly toward the left whereupon the pin 23 will travel to the end of the slot 37 as at 40 and the pin 24 will move in the slot 38 in order that the cam plate 44 may engage the upper enlarged portion 28 of the plunger 27 to release the latch or dog 11 and move the projection 13 thereof out of engagement with the teeth 6 formed on the segment plate 5.

It it to be understood that the form of the invention herewith shown and described is to be taken as the preferred embodiment of the same and that various changes in the shape, size and arrangement of parts may be resorted to without departing from the spirit of the invention or the scope of the sub-joined claims.

I claim:—

1. In combination with a brake lever having a latch rod extending to the top thereof, of a tubular extension secured to the upper end of said brake lever, a tensioned sliding plunger mounted in the tubular extension adapted to engage the latch rod of the brake lever, a pair of pins extending transversely of the upper end of the tubular extension, a cam having arcuate slots therein extending substantially at right angles to each other in intersecting relations received on said pins for pivotal support and adapted to engage the brake release rod and a handle secured to the cam.

2. In combination with a brake lever having a latch release rod, of a tubular extension secured to the upper end of the brake lever, a tensioned sliding rod mounted in the tubular extension adapted to engage the brake release rod, a cam pivoted to the upper end of the tubular extension adapted to engage the sliding rod, the cam pivot including pins carried by the upper end of the tubular extension and slots in the cam through which the pins extend and a handle formed integral with the cam for moving the brake lever and simultaneously operating the brake release rod.

3. In combination with a lever having a latch and operating rod, of a tubular extension secured to the upper end of the lever, a tensioned sliding plunger mounted within the tubular extension having a connection with the latch operating rod, a cam movably mounted on the upper end of the tubular extension and having a pair of cam slots therein substantially at right angles to each other, pins carried by the upper end of the lever respectively extending through said slots, and a manually operating handle secured to the cam adapted to move said cam into engagement with the sliding plunger to release said latch.

4. In combination with a lever having a latch and operating rod, of a tubular extension secured to the lever having a bifurcated upper end, a sliding plunger mounted in said tubular extension, a cam having cam slots mounted between the bifurcated end of the tubular extension, a pair of pins extending across the bifurcated portion for being received in the cam slots and a handle secured to the cam adapted to be operated manually to move said cam into and out of engagement with the sliding plunger whereby the lever latch may be released.

5. In combination with a brake lever having a latch and operating rod therefor, of a tubular extension adapted to be secured to the brake lever, a sliding plunger mounted within the tubular extension having its lower end connected to the latch operating rod, a coil spring encircling the sliding plunger to normally urge the same upwardly, a pair of spaced enlarged portions extending upwardly from the tubular extension, a cam mounted between the spaced enlarged portions, said cam plate having a pair of cam slots formed therein, pins carried by the spaced enlarged portions extending through said slots, and a handle formed on said cam plate adapted to move said cam into engagement with the sliding plunger to release the latch of the brake lever.

ECHARD E. SMITH.